Aug. 5, 1969     A. T. BRACKEN ET AL     3,459,413
GLASS TANK COOLERS
Filed Oct. 9, 1967     2 Sheets-Sheet 1
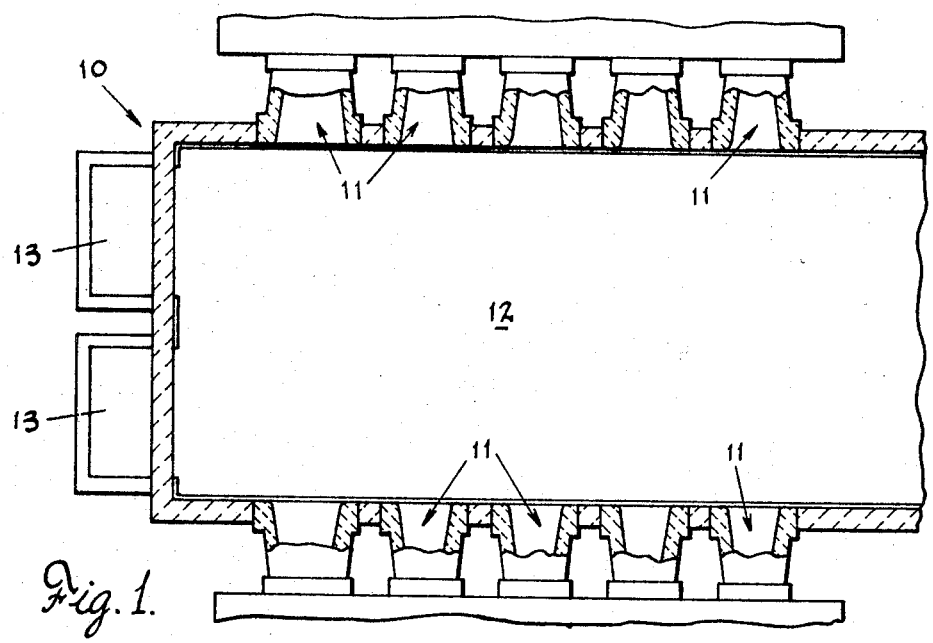
Fig. 1.
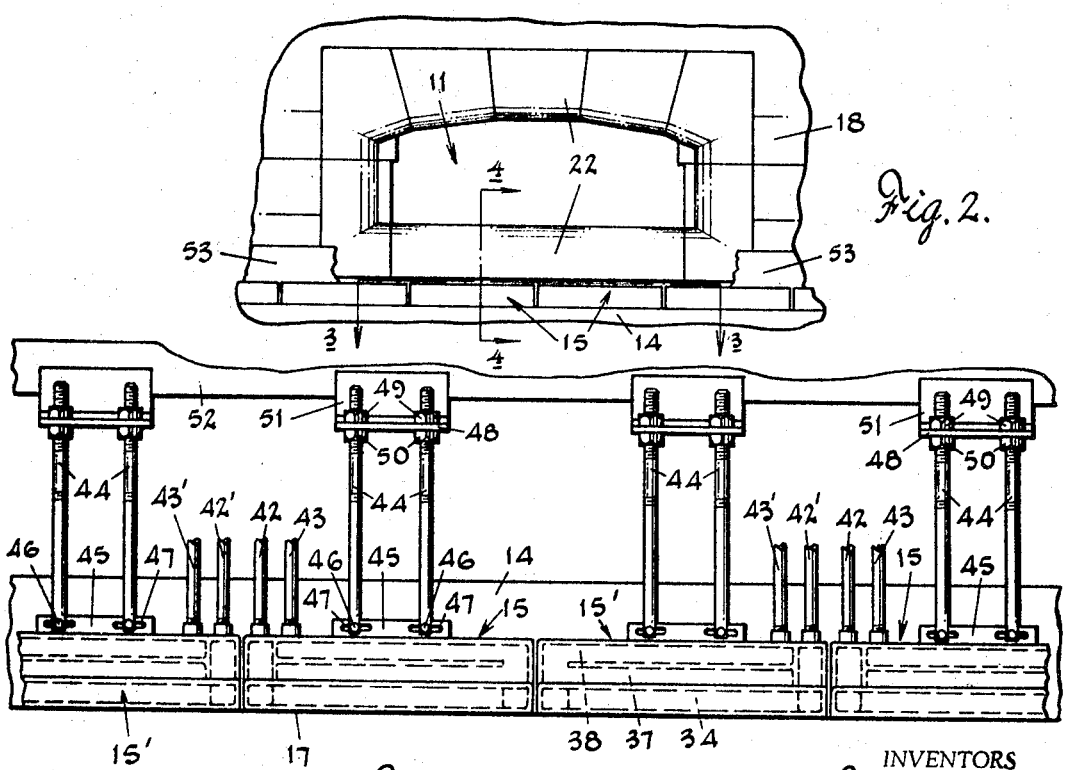
Fig. 2.
Fig. 3.
INVENTORS
Aubrey T. Bracken,
Millen E. Luhrs, and
Charles F. Green
Collins & Oberlin
ATTORNEYS Aug. 5, 1969　　A. T. BRACKEN ET AL　　3,459,413
GLASS TANK COOLERS
Filed Oct. 9, 1967　　2 Sheets-Sheet 2
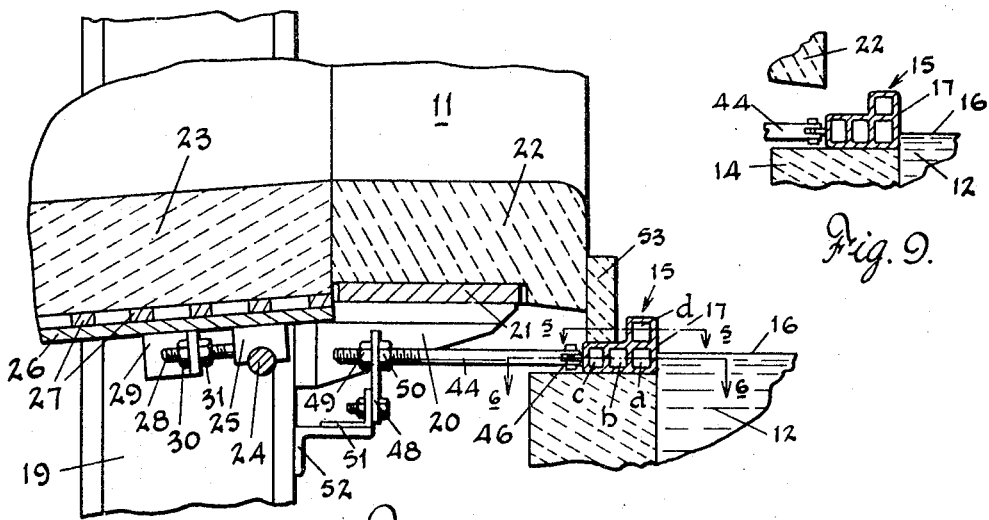
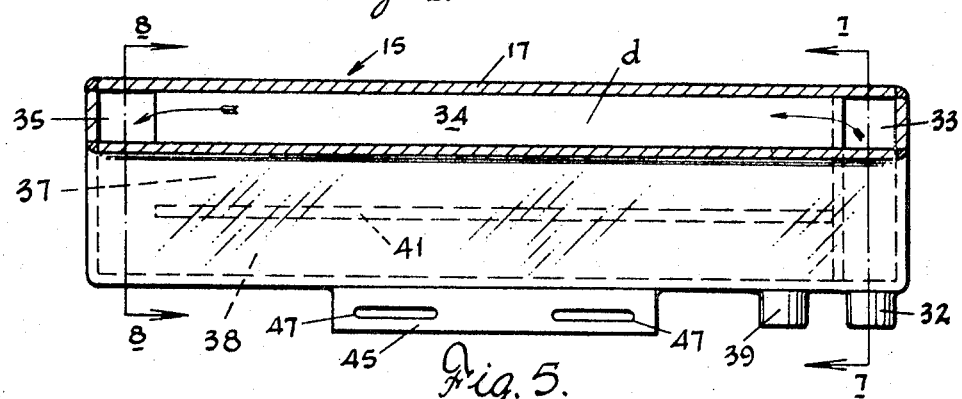
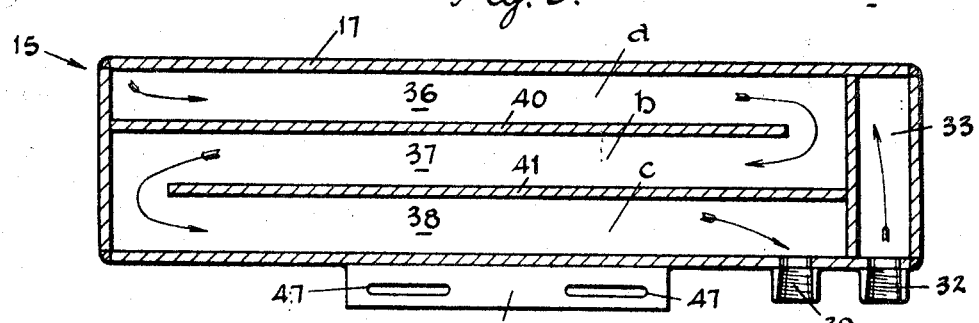
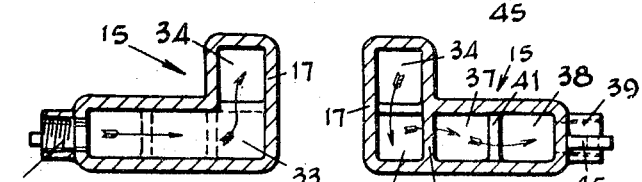
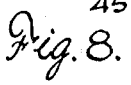
INVENTORS
Aubrey T. Bracken,
Millen E. Luhrs, and
Charles F. Green
Collins & Oberlin
ATTORNEYS

****

3,459,413
GLASS TANK COOLERS
Aubrey T. Bracken, Millen E. Luhrs, and Charles F. Green, Toledo, Ohio, assignors to Libbey-Owens-Ford Company, Toledo, Ohio, a corporation of Ohio
Filed Oct. 9, 1967, Ser. No. 673,541
Int. Cl. F27d 1/12, 9/00; C02b 5/22
U.S. Cl. 263—44
7 Claims

ABSTRACT OF THE DISCLOSURE

Heat exchangers which rest upon the lower side walls of a continuous glass melting and refining furnace cool the walls to retard the eroding action of the molten glass within the furnace. The L-shaped configuration of the heat exchangers enables them to act as a base for refractory blocks which seal the space between the upper and lower side walls thereby imparting a cooling effect to the upper walls, while the lip formed thereby prevents refractory particles which flake off the upper walls from falling into the furnace.

---

This invention relates to continuous tank furnaces for melting and refining glass and more particularly to improved apparatus for minimizing deterioration of the walls of furnaces of this type.

In the operation of such a glass furnace, a bath of molten glass is maintained within the tank, the glass-forming materials being introduced into the tank at one end and refined glass withdrawn at the other end. The high temperature required is maintained by causing flames emanating from ports formed in the side walls of the melting area of the furnace tank to play upon the surface of the bath of glass.

The side walls of the furnace are built of refractory blocks which are continually eroded away during operation by combined physical and chemical action of the molten glass. Within the melting portion of the furnace the heating of the glass sets up convection currents within the bath causing a constant flow of molten glass against the walls resulting in rapid physical erosion of the wall surface. At the glass surface, or glass line, there is an additional chemical erosion caused by the action of fluxing agents which float to the surface.

Above the glass surface deterioration of the furnace walls is caused by fusion of the refractory material and by chemical action produced by the corrosive nature of the molten glass environment. This deterioration is most pronounced during the heating up of the furnace and is manifested in a flaking off of particles of refractory material which drop into the glass bath where they can eventually cause imperfections in the finished glass product. Such deterioration occurs most rapidly on the walls immediately above the glass line in the area of the burner ports where the concentration of heat is greatest.

It is known that cooling of the tank walls, particularly in the area of the glass line, will substantially reduce the rate of erosion due to the fact that the cooling effect on the glass in contact with the walls increases its viscosity and thereby retards the flow caused by convection currents, shifting the currents outward away from the walls.

One method by which wall cooling can be effected is by placing coolers, generally in the form of water boxes, upon the upper face of the walls at the glass line. In addition to the effect on convection currents produced by cooling the walls, putting the glass at the surface of the bath in direct contact with the water box causes the glass to become solidified and a glass facing is formed on the cooler which protects the cooler from chemical attack by the floating fluxing agents.

Existing glass line coolers of this general type, however, have no measurable effect on the erosion of the upper walls above the glass line since the upper and lower walls are independent of one another and the coolers are only effective as to the lower walls. Also, since it is not possible to completely eliminate erosion, the tank walls tend to become eroded away beneath the cooler causing the cooler, which is protected by the solid glass film formed thereon, to overhang the wall. This not only causes a loss of effective cooling area but also results in a non-uniform wall surface which has a tendency to erode more rapidly than one which is substantially uniform.

In view of these problems it is a primary object of this invention to provide a glass line cooler having a physical configuration which will prevent refractory particles, which have flaked off the upper furnace walls, from dropping into the glass bath.

Another object of the invention is to provide a glass line cooler having a physical configuration such that it will serve as a base for refractory blocks protecting the upper furnace walls and will impart a cooling effect to said blocks.

Another object of the invention is to provide a glass line cooler of improved design to more effectively transfer heat from the lower and upper furnace walls.

Another object of the invention is to provide a glass line cooler which can be adjustably positioned with respect to the furnace wall upon which it rests to maintain a uniform wall face.

Other objects and advantages of the invention will become more apparent during the course of the following description when taken in connection with the accompanying drawings.

In the drawings, wherein like numerals are employed to designate like parts throughout the same:

FIG. 1 is a partial plan view of the melting end of a continuous tank furnace at the level of the burner ports;

FIG. 2 is a partial side elevation of a furnace wall showing one burner port;

FIG. 3 is a partial plan view taken along line 3—3 of FIG. 2 showing the arrangement of several coolers constructed in accordance with the present invention;

FIG. 4 is a fragmentary cross-sectional view taken along line 4—4 of FIG. 2;

FIG. 5 is a sectional view taken along line 5—5 of FIG. 4 showing structural details of the upper section of one cooler;

FIG. 6 is a sectional view taken along line 6—6 of FIG. 4 showing structural details of the lower section of one cooler;

FIG. 7 is a sectional view of one cooler taken along line 7—7 of FIG. 5;

FIG. 8 is a sectional view of one cooler taken along line 8—8 of FIG. 5; and

FIG. 9 is a fragmentary cross-sectional view similar to FIG. 4 but before placement of the sealing blocks.

Referring now to the drawings, the present invention is depicted, by way of example, as it would be used with a continuous glass tank furnace of the reversible regenerative type; however, it will become apparent that the novel features of the invention will have application to tank furnaces in general and are not to be restricted to a particular variation thereof.

In a typical reversible regenerative furnace 10, the melting end of which is illustrated in FIG. 1, gas flames emerge from a line of ports 11 on one side of the furnace and flow transversely over the surface of the bath of molten glass 12 within the tank and the products of combustion exhaust through identical ports on the opposite side. Periodically the direction of the flame flow is reversed and the flames enter the ports that have served for exhaust and the products of combustion exit through the ports that have served as inlet ports.

Glass-forming materials are introduced into the furnace through box-like vestibules 13 which are commonly referred to as dog houses at the melting end of the furnace.

The lower side walls 14 of the furnace are constructed of refractory blocks and generally end at a point slightly above the glass surface. The coolers 15 of the present invention rest on the top surface of sections of the lower side walls of reduced height just below the burner ports such that the glass line 16 is at the level of the cooler face 17 (FIG. 4). Each side wall is equipped with a series of such coolers arranged end-to-end as illustrated in FIGS. 2 and 3, extending from the dog houses 13 to a point just beyond the last burner port.

The upper furnace side walls 18 are supported independently of the lower side walls by means of a series of buckstays 19 which also support the furnace arch (not shown). A bracket 20 fixed to each buckstay is surmounted by a base plate 21 upon which the weight of the wall is distributed.

The burner ports 11 are also constructed of refractory material and consist of two separate sections. The inner section 22 which opens into the furnace is built into and forms a part of the wall 18 is shown in FIG. 2 and is supported on the brackets 20.

The outer section 23 of each burner port is supported on a pivot rod 24 which is fixed to the buckstay 19 and is suspended from above at its outer end (not shown). A pivot block 25 transfers the weight of the port section 23 from a base plate 26 which is spaced from said section by a series of spaced rails 27. The pivot block 25 is in sliding contact with the base plate 26 and is held in place by a threaded member 28 which is received in a bracket 29 fixed to the base plate 26 and secured thereto by a pair of nuts 30 and 31, one on either side of the bracket. By adjusting the nuts 30 and 31, the outer port section can be moved with respect to the pivot rod 24 making it possible to maintain a tight fit between the two port halves 22 and 23.

The cooler 15 comprises a metal casing made up of three integral elongated parallel sections $a$, $b$ and $c$, arranged side-by-side in a common plane and an integral raised section $d$ disposed above and parallel with section $a$ so that in cross-section the cooler is substantially L-shaped as shown in FIG. 4, with the raised section $d$ constituting a lip or barrier, the purpose of which will be more fully described at a later point in the discussion. The interior of the cooler is divided into four interconnected cooling chambers for maximum heat exchange effect.

The cooling medium ordinarily used is water, which enters the cooler at one end through an inlet fitting 32 and flows through a transverse entrance chamber 33 and thence upwardly into the longitudinally extending chamber 34 of section $d$. The water then travels the length of the cooler from right to left as indicated by the arrows in FIG. 5. Upon reaching the opposite end of chamber 34, the water passes downwardly through an opening 35 into the adjacent end of chamber 36 of section $a$ and flows through chamber 36 from left to right as indicated by the arrows in FIG. 6. The water then passes from the opposite end of chamber 36 into chamber 37 of section $b$, flowing from right to left, and thence into chamber 38 of section $c$, flowing from left to right, and discharges through an outlet fitting 39.

The arrangement of longitudinal walls or baffles 40 and 41 separating the chambers 36, 37 and 38 forces the water flow to reverse at the ends of the cooler, thus causing the cooling water to flow back and forth across the cooler in a serpentine path, resulting in a more effective use of the cooler heat transfer area than would be made if the cooler comprised a single open chamber.

It is preferred that half of the coolers 15 be constructed as described, while the other half 15' be made with the water fittings at the opposite end and the internal baffles reversed accordingly so that when the coolers are positioned end-to-end on the lower furnace side walls as shown in FIG. 3, each pair of inlet pipes 42 and 42' and outlet pipes 43 and 43' are grouped together thereby facilitating connection to a water supply.

The coolers rest on the top surface of the lower side walls 14 and each cooler is positioned thereon by a pair of rods 44 attached to the cooler by a clevis arrangement. Thus, the outer end of each rod is slotted to fit over a plate 45 fixed to the outer face of the cooler 15. The clevis pin 46 is received in a hole in the rod and a slot 47 in the plate 45. The opposite end of each rod is threaded, the threaded portion extending through a hole provided in a vertical bracket plate 48 and secured thereto by a pair of nuts 49 and 50 which bear against the bracket. The bracket plate 48 is bolted to an angle bracket 51 which is secured to another angle bracket 52 attached to the buckstays 19. There is one each of bracket plate 48 and bracket 51 for each pair of rods associated with each cooler; whereas, the bracket 52 extends across several buckstays and serves all the coolers on one side of the furnace.

This mounting arrangement enables the coolers to be replaced as necessary without seriously affecting furnace operation and also permits the coolers to be placed close together along the furnace wall while allowing for expansion and for variations in the overall size of each cooler.

The threaded rod and lock nut arrangement permits each cooler to be accurately positioned on the lower side wall by moving it toward or away from the center of the furnace. When first installed, the coolers are mounted flush with the inner face of the lower wall 14 (FIG. 4); however, during the course of furnace operation, the wall erodes more rapidly than the relatively cold inner face 17 of the cooler which is protected by a layer of substantially solidified glass formed thereon by virtue of its low temperature. As a result, the inner wall face contacted by the molten glass will gradually recede beneath the cooler. As the inner wall face recedes, each cooler is moved outwardly to maintain its flush relation with the inner wall face by repositioning the nuts 49 and 50 with respect to the bracket plate 48.

In normal operation, a positive pressure is maintained inside the furnace; threrefore, the furnace walls must be substantially sealed in order to maintain this pressure and to prevent "sting out" of the flames. According to the present invention, this is accomplished by placing blocks of refractory material 53 on top of the lower sections $b$ and $c$ of the cooler 15 and flat against the facing of the upper wall 18. These blocks, which are easily replaced, provide a physical barrier to protect the facing of the upper wall from erosion and the cooling effect imparted to the blocks by their contact with the coolers greatly reduces the rate of erosion of the blocks themselves.

The function of the coolers occurs in two distinct phases. Prior to being put into actual operation, the furnace goes through a gradual warm-up period during which time it is filled with glass cullet. During this warm-up phase, the furnace is not pressurized and the sealing blocks 53 are not yet put into place, as shown in FIG. 9. It is during this phase that a relatively large number of particles of the refractory material of the upper wall tend to flake off. The lip formed by the upper section $d$ of the cooler serves as a barrier to prevent the refractory particles that drop onto the sections $b$ and $c$ of the cooler from passing into the tank, causing them to fall outside the furnace. Once the furnace is up to operating temperature, this flaking is substantially reduced and the sealing blocks 53 are placed in position as shown in FIG. 4. Any particles which may subsequently flake off will be caught in the space left between the sealing blocks and the lip of the cooler.

During normal furnace operation, when molten glass is being withdrawn from the furnace and new glass making materials are introduced into the doghouses 13, water is circulated through the coolers as previously described, removing heat from the lower furnace walls 14 upon which the coolers rest, from the refractory sealing blocks 53 and directly from the glass in contact with the inner faces 17 of the coolers. The cooling of the refractory material has a direct effect in resisting erosion in that the material erodes less rapidly as its temperature is decreased and an indirect effect with respect to the material in contact with the glass in that cooling of the glass in the vicinity of the wall increases its viscosity and retards the flow of glass against the walls caused by convection currents within the tank. By thus forcing the convection currents inward away from the walls at the glass surface where the currents start, the flow of glass against the walls is reduced for the entire height of the wall even though there is practically no cooling effect on the lower portions.

It is to be understood that the forms of the invention herewith shown and described are to be taken as illustrative embodiments only of the same and that various changes in the shape, size and arrangements of parts may be resorted to without departing from the spirit of the invention.

We claim:

1. In a tank furnace containing a mass of molten glass, a lower side wall with which the molten glass is in contact, an upper side wall disposed above and supported independently from said lower wall, the inner surface of said upper wall being positioned outwardly of the inner surface of said lower wall, an elongated heat exchanger resting upon said lower wall, said heat exchanger being generally L-shaped in cross section with one of its legs extending along the top of said lower wall and the other of its legs extending upwardly and spaced inwardly from said inner surface of said upper wall, and sealing means closing the space between said heat exchanger and upper wall, said sealing means being spaced from said upwardly extending leg of said heat exchanger whereby said leg prevents material eroded from said upper wall from dropping into said molten glass.

2. A tank furnace containing a mass of molten glass as claimed in claim 1, in which said heat exchanger comprises a tank having a plurality of parallel, interconnected chambers formed by internal baffles arranged to define a serpentine path for the passage of a cooling medium therethrough.

3. A tank furnace containing a mass of molten glass as claimed in claim 1, in which said sealing means comprises a refractory member resting on said heat exchanger the interface between said member and said heat exchanger defining a heat transfer area.

4. A tank furnace containing a mass of molten glass as claimed in claim 1, including means mounted in outwardly spaced relation to the lower wall for positioning said heat exchanger flush with the inside of the lower side wall and for progressively moving said heat exchanger inwardly or outwardly to maintain said flush condition as the inside of said wall erodes.

5. A tank furnace containing a mass of molten glass as claimed in claim 4, in which said positioning means comprises at least one rod pivotally fastened at one end to said heat exchanger, and means for adjustably securing the opposite end of said rod to the furnace.

6. A heat exchanger comprising a substantially L-shaped tank having baffles therein to form a plurality of parallel elongated chambers, at least two of said chambers being disposed coextensive with one another in a common plane and at least one other chamber being disposed coextensive with one of said first-named chambers in a second plane to form said L-shape, all of said chambers being interconnected to provide a continuous, serpentine path for the passage of a cooling medium therethrough.

7. In a tank furnace containing a mass of molten glass, a lower side wall with which the molten glass is in contact an upper side wall disposed above and supported independently from said lower wall, the inner surface of said upper wall being positioned outwardly of the inner surface of said lower wall, an elongated heat exchanger resting upon said lower wall, said heat exchanger being generally L-shaped in cross-section with one of its legs extending horizontally along the top of said lower wall and the other of its legs extending upwardly and spaced inwardly from said inner surface of said upper wall, and a refractory member resting directly on said horizontal leg and closing the space between said heat exchanger and upper wall, said member being spaced from said upwardly extending leg of said heat exchanger and overlapping a portion of the inner surface of said upper wall whereby said upwardly extending leg prevents material eroded from said upper wall from dropping into said molten glass.

References Cited
UNITED STATES PATENTS
3,363,887  1/1968  Nevard _____ 263—46

JOHN J. CAMBY, Primary Examiner

U.S. Cl. X.R.

65—337; 165—161